June 6, 1933.  H. HEINEMANN  1,912,580

GRUBBER FOR LOOSENING THE SOIL

Filed Dec. 31, 1931

Patented June 6, 1933

1,912,580

UNITED STATES PATENT OFFICE

HANS HEINEMANN, OF UTHMODEN NEAR NEUHALDENSLEBEN, GERMANY

GRUBBER FOR LOOSENING THE SOIL

Application filed December 31, 1931, Serial No. 584,141, and in Germany March 13, 1930.

This invention relates to a grubber for loosening forest and agricultural land, virgin soil and the like. The grubber consists in known manner of a cylinder, on which scoop-like tools are fitted. Contrary to the known grubbers the tools according to the invention are not arranged radially, but directed in the opposite direction to that of rotation, that is are bent towards the rear. This shaping is important in two respects. Firstly the scoop will engage with its front end flat on the ground and consequently a certain resistance will be offered to the penetration of the scoop into the ground. The implement rotates from this instant around the bearing point on the end of the cylinder and no longer around the centre of the cylinder. Consequently this bearing point is loaded and the scoop penetrates like a knife into the ground substantially in the direction of an inclined plane formed by the back of the scoop to the ground. Thus the deepest position of the knife is obtained, seeing that the more the cylinder rises, the more difficult will be the penetration of the scoop, and the cylinder then rotates around its central axis until the next scoop comes into contact with the ground. This scoop then also slides forwards and downwards in the direction of its back. The second scoop in the ground is not simply pulled out, but effects a rooting movement towards the front in the pulling direction of the cylinder. The earth thus loosened is then lifted when the third scoop comes into contact with the ground and then dropped, as the cylinder continues to rotate. In this manner slight undulations are produced one behind the other in the earth which automatically partly crumble according to the condition of the soil.

The lifting of the soil by the scoops can be intensified by making the ends of the scoops slightly trough-shaped, the end of this trough extending at an acute angle to the scooping direction.

The number of scoops arranged side by side in a row on the cylinder depends upon the kind of soil (in the case of agricultural land and marsh sand, the scoops can be arranged closer together than for forest land), and upon the kind of drive.

An embodiment of the invention is illustrated by way of example in the accompanying drawing, in which:—

Figure 1:
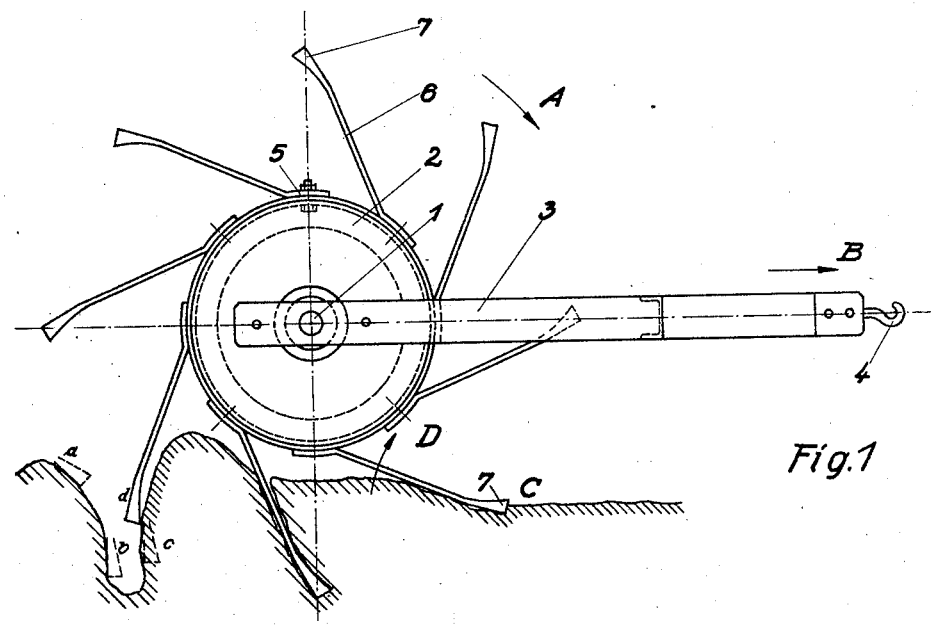
Fig. 1 shows the cylinder in side elevation.
Figure 2:
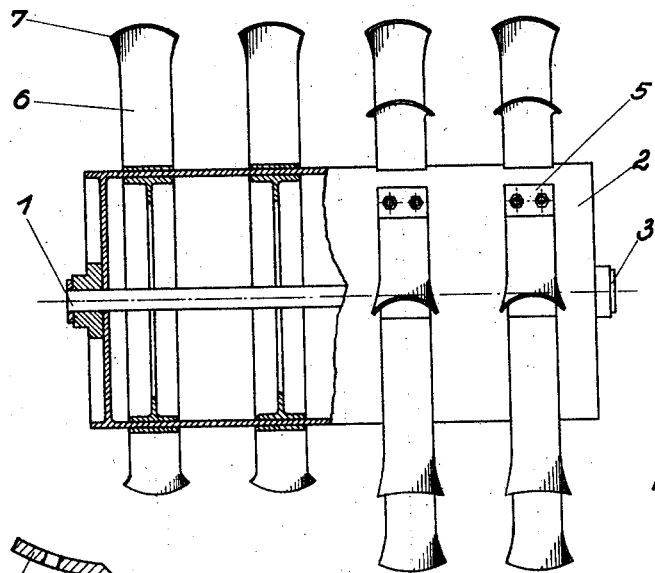
Fig. 2 is a front view of Fig. 1, partly in section.
Figure 3:
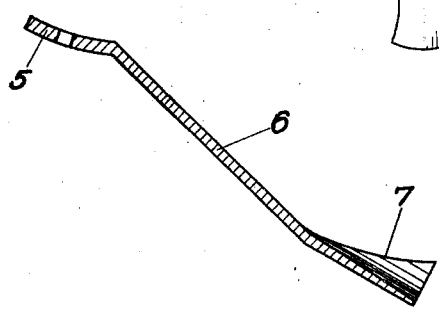
Fig. 3 shows a single scoop in longitudinal section.

An axle 1 of a cylinder 2 is journaled in a frame 3 carrying at its front end a drawhook 4, to which for example the draft animal can be connected. The cylinder carries a plurality of rows of scoops. Each scoop consists of three parts, namely a foot 5 fixed by means of screws to the cylinder, the scoop proper 6 arranged at an angle to the foot inclined in the opposite direction to the direction of rotation A of the cylinder and a head end 7, which is standing also at a slight angle to the scoop 6 and made trough-shaped, in order to grip the soil, when lifting.

The scoop operates in the following manner:—

As the cylinder moves in the direction of the arrow B, the cylinder is first rotated in the direction of the arrow A. The heads 7 of the juxtaposed scoops come into contact with the ground at the point C. The scoop then turns around this point in the direction of the arrow D, the scoop thereby penetrating into the ground on an inclined plane substantially corresponding to the direction of the back of the scoop. The trough-shaped end of the scoop thereby travels from $a$ to $b$, as shown on the left of Fig. 1. At the same time the preceding scoops have slightly lifted the soil. The cylinder then again rolls forward a short distance on the ground, the end of the scoop travelling from $b$ to $c$, so that a small depression is formed in the ground, whereas, as the cylinder rises, the scoops which have already penetrated into the ground, will slightly loosen the soil and, as the cylinder continues to rotate, will lift the soil and allow it to again drop, the scoops being lifted from $c$ to $d$. Thus the soil is deposited in ridges situated one behind the other.

I claim:—

1. A grubber for loosening soil, comprising in combination a frame, an axle journalled in said frame, a cylinder mounted on said axle and adapted to serve as supporting and running wheel for the grubber, rows of scoops arranged around the circumference of said cylinder, and a fixing part of each of said scoops forming an obtuse angle with its scoop so that said scoops are inclined towards the rear relative to the direction of rotation of said cylinder and the free ends of said scoops come into contact with the ground in flat position and penetrate therein on an inclined plane.

2. A grubber for loosening soil as specified in claim 1, in which the front end of each scoop extends at a slight angle to the scoop and is of trough-shape.

In testimony whereof I affix my signature.

HANS HEINEMANN.